United States Patent [19]

Matsubara et al.

[11] Patent Number: 4,587,294

[45] Date of Patent: May 6, 1986

[54] CONTINUOUS PROCESS FOR PRODUCING RUBBER MODIFIED HIGH-IMPACT RESINS

[75] Inventors: Tetsuyuki Matsubara; Norifumi Ito, both of Yokohama; Kouzo Ichikawa, Hatano; Kouichi Arahari, Zama; Tetsuo Maeda, Urayasu, all of Japan

[73] Assignees: Mitsui Toatsu Chemicals, Inc.; Toyo Engineering Corporation, both of Tokyo, Japan

[21] Appl. No.: 545,167

[22] Filed: Oct. 25, 1983

[30] Foreign Application Priority Data

Nov. 4, 1982 [JP] Japan ................................ 57-192574

[51] Int. Cl.$^4$ ...................... C08F 279/04; C08L 55/02
[52] U.S. Cl. ..................................... 525/53; 525/315; 525/316; 525/942
[58] Field of Search .......................... 525/53, 315, 316

[56] References Cited

U.S. PATENT DOCUMENTS 4,421,895 12/1983 Echte et al. ........................... 525/53

FOREIGN PATENT DOCUMENTS 1121885 7/1968 United Kingdom .

Primary Examiner—Wilbert J. Briggs, Sr.

Attorney, Agent, or Firm—Fisher, Christen & Sabol

[57] ABSTRACT

In a continuous bulk or solution polymerization process for producing rubber modified high-impact resins which comprises continuously feeding a raw material solution comprising a mixture of an aromatic vinyl monomer and a vinyl cyanide monomer and a rubber component dissolved in the mixture, together with a radical polymerization initiator, to a first reactor, polymerizing the raw material solution under high-shear agitation to a conversion required to transform the rubber component phase into dispersed particles, withdrawing the reaction mixture continuously from the first reactor at a rate corresponding to the feed rate of the raw material solution, and feeding the reaction mixture to a second or more reactors for further polymerization, rubber modified high-impact resins exhibiting excellent chemical resistance, thermal resistance and rigidity and having a good surface gloss can be produced by properly determining the weight ratio of the aromatic vinyl monomer to the vinyl cyanide monomer present in the raw material solution, the content of the rubber component in the raw material solution, the content of the solvent in the raw material solution, the property of the rubber component, the property of the radical polymerization initiator and the amount of initiator used, as well as the conversion of the monomers at the first reactor.

2 Claims, No Drawings

CONTINUOUS PROCESS FOR PRODUCING RUBBER MODIFIED HIGH-IMPACT RESINS

BACKGROUND OF THE INVENTION

1. Field of the Invention

This invention relates to improvements in a continuous process for producing rubber modified high-impact resins. More particularly, it relates to an improved process for producing rubber modified high-impact resins wherein a raw material solution comprising a mixture of an aromatic vinyl monomer and a vinyl cyanide monomer and a rubber component dissolved therein is continuously subjected to bulk or solution polymerization to obtain a rubber modified high-impact resin exhibiting excellent chemical resistance, thermal resistance and rigidity and having a good surface gloss.

2. Description of the Prior Art

High-impact polystyrenes (hereinafter referred to as "HI-PS resins") are resins obtained by polymerizing styrene in the presence of a rubber component to improve the impact resistance of the polystyrene and are being used in a wide range of applications. Although HI-PS resins are sometimes produced by batch polymerization processes (such as bulk—suspension polymerization processes), there is a recent tendency toward the increasing use of continuous bulk polymerization processes. On the other hand, acrylonitrile-butadiene-styrene copolymeric resins (hereinafter referred to as "ABS resins") obtained by polymerizing styrene and acrylonitrile in the presence of a rubber component have found many uses by reason of their excellent impact resistance, chemical resistance, thermal resistance and rigidity as well as their good surface gloss. Generally, ABS resins are being produced by the so-called emulsion polymerization process in which styrene and acrylonitrile are added to a latex containing a rubber component and the resulting mixture is subjected to polymerization. However, a number of problems are encountered in carrying out this emulsion polymerization process. Specifically, large-scale polymerization equipment is required because the latex must be used in an amount equal to several times that of the desired polymer; the process control is complicated because a number of incidental steps such as emulsification, coagulation, drying and other steps are involved; and the resulting polymer may be unavoidably contaminated with impurities because such additives as emulsifiers, coagulants and the like are used. Accordingly, Japanese Patent Publications No. 35354/'74 and No. 35355/'74 have proposed improved emulsion polymerization processes for producing ABS resins in which the rubber component present in the latex is first extracted with styrene and acrylonitrile and the resulting reaction mixture is then subjected to continuous bulk polymerization. Although these improved processes are simpler than the conventional emulsion polymerization process, they still involved a complicated extraction step.

In addition to the above, continuous bulk or solution polymerization processes for producing ABS resins have also been proposed. They are disclosed, for example, in B.P. No. 1,121,885, D.E. No. 2,152,945, U.S. Pat. No. 4,198,383 and the like. It is mentioned therein that these processes have the advantages of simplifying the polymerization and after-treatment steps and decreasing the production of waste materials tending to induce environmental pollution. However, these processes are disadvantageous in that the resulting resins do not always exhibit excellent properties, their surface gloss especially characteristic of ABS resins may be impaired, and/or special equipment is needed.

SUMMARY OF THE INVENTION

It is an object of the present invention to provide a continuous polymerization process for producing rubber modified high-impact resins exhibiting excellent chemical resistance, thermal resistance and rigidity and having a good surface gloss.

It is another object of the present invention to provide a process for producing rubber modified high-impact resins having the above-described excellent properties by means of equipment in common use for the continuous bulk or solution polymerization of HI-PS resins.

According to the present invention, there is provided a continuous bulk or solution polymerization process for producing rubber modified high-impact resins which comprises continuously feeding a raw material solution comprising a mixture of an aromatic vinyl monomer and a vinyl cyanide monomer and a rubber component dissolved in said mixture, together with a radical polymerization initiator, to a first reactor, polymerizating said raw material solution under high-shear agitation to the conversion required to transform the rubber component phase into dispersed particles, withdrawing the reaction mixture continuously from said frst reactor at a rate corresponding to the feed rate of said raw material solution, and feeding said reaction mixture to a second or more reactors for further polymerization, the process being characterized in that (A) the weight ratio of said aromatic vinyl monomer to said vinyl cyanide monomer present in said raw material solution ranges from 99/1 to 50/50;

(B) said rubber component has a viscosity of not greater than 100 centistokes when measured as a 5% solution in styrene at 30° C.;

(C) the content of said rubber component in said raw material solution is not greater than 10% by weight;

(D) the content of the solvent in said raw material solution is not greater than 40% by weight;

(E) said radical polymerization initiator has a 10-hour half-life decomposition temperature of 100° C. or below;

(F) said radical polymerization initiator is fed to said first reactor in an amount of not less than 30 ppm based on said raw material solution; and (G) the conversion of said monomers at said first reactor is controlled in such a way that it lies between 10 and 35% by weight.

DETAILED DESCRIPTION OF THE PREFERRED EMBODIMENTS

As the aromatic vinyl monomer used in the process of the present invention, there may be used one or more compounds selected from styrene, α-methylstyrene, styrenes having alkyl substituents on the benzene ring (e.g., o-, m- or p-methylstyrene and o-, m- or p-tert-butylstyrene), styrenes having halogen substituents on the benzene ring (e.g., o-, m- or p-chlorostyrene and o-, m- or p-bromostyrene), and the like. As the vinyl cyanide monomer, there may be used one or more compounds selected from acrylonitrile, methacrylonitrile and the like. If desired, copolymerizable monomers such as acrylic esters (e.g., methyl methacrylate), maleic anhydride and the like may be added to the raw material solution.

The weight ratio of the aromatic vinyl monomer to the vinyl cyanide monomer present in the raw material solution can range from 99/1 to 50/50 and preferably from 95/5 to 50/50. If the weight ratio of the aromatic vinyl monomer to the vinyl cyanide monomer is greater than 99/1, the resulting resin will have poor chemical resistance, rigidity and thermal resistance. If the weight ratio is less than 50/50, the resulting resin will have a poor surface gloss and low fluidity.

The rubber component can be any common rubber that is soluble in the above-described monomers. Specific examples of useful rubbers include butadiene rubber, styrene-butadiene copolymeric rubber, acrylonitrile-butadiene copolymeric rubber, chloroprene rubber, ethylene-propylene copolymeric rubber, ethylene-propylenediene copolymeric rubber and the like. These rubbers should have a viscosity of not greater than 100 centistokes when measured as a 5% solution in styrene at 30° C. It is well known that, in the case of bulk or solution polymerization, the rubber component which is initially present in a homogeneous solution separates from the other components at or above a certain conversion of the monomers and takes the form of dispersed particles. This phenomenon is generally referred to as "phase inversion". If the rubber component present in the raw material solution has a solution viscosity of greater than 100 centistokes, the resulting dispersed particles of the rubber component will be unduly large and, hence, the resulting resin will have a poor surface gloss.

The content of the rubber component in the raw material solution should be not greater than 10% by weight. If the content of the rubber component in the raw material solution is greater than 10% by weight, the dispersed particles resulting from the phase inversion of the rubber component at the first reactor will be unduly large and, hence, the resulting resin will have a poor surface gloss.

The raw material solution used in the process of the present invention may consist solely of the aromatic vinyl monomer, the vinyl cyanide monomer and the rubber component. If desired, however, a solvent selected from aromatic hydrocarbons, aliphatic hydrocarbons, alicyclic hydrocarbons, halogenated hydrocarbons, ketones and the like can be added thereto in an amount of not greater than 40% by weight. If the amount of solvent used is greater than 40% by weight, the chain transfer effect will undesirably be enhanced to enlarge the resulting dispersed particles of the rubber component and reduce the production efficiency.

In the first step of the process of the present invention, polymerization is carried out by continuously feeding the raw material solution, together with a radical polymerization initiator as the catalyst, to a first reactor. Useful radical polymerization initiators are organic peroxides, azo compounds and the like, and they should have a 10-hour half-life decomposition temperature of 100° C. or below and preferably 90° C. or below. Specific examples of such radical polymerization initiators include lauroyl peroxide, tert-butyl peroxy(2-ethylhexanoate), benzoyl peroxide, 1,1-bis(tert-butylperoxy)-3,3,5-trimethylcyclohexane, azobisisobutyronitrile, azobis-2-methylbutyronitrile and the like, and these radical polymerization initiators may be used alone or in combination. If the polymerization within the first reactor is thermally initiated without the use of any radical polymerization initiator, the dispersed particles resulting from the phase inversion of the rubber component at th first reactor will be unduly large and, hence, the resulting resin will have a poor surface gloss. If the polymerization is initiated by means of a radical polymerization initiator but its 10-hour half-life decomposition temperature is above 100° C., it will be necessary to raise the polymerization temperature. Thus, the proportion of thermally initiated polymerization will be increased to enlarge the dispersed particles of the rubber component to an undue extent.

The radical polymerization initiator should be fed to the first reactor in an amount of not less than 30 ppm and preferably not less than 50 ppm based on the raw material solution. If the amount of radical polymerization initiator used is less than 30 ppm, it will be necessary to raise the polymerization temperature. Thus, the proportion of thermally initiated polymerization will be increased to enlarge the dispersed particles resulting from the phase transition of the rubber component within the first reactor.

In the process of the present invention, the conversion of the monomers at the first reactor should suitably be controlled in such a way that it lies between 10 and 35% by weight and preferably between 13 and 30% by weight. If the conversion of the monomers at the first reactor is less than 10% by weight, the degree of conversion of the monomers is so low that phase inversion of the rubber component cannot occur or, if it occurs, the resulting dispersed particles will be unstable and unduly large. If the conversion of the monomers at the first reactor is greater than 35% by weight, the dispersed particles resulting from phase inversion of the rubber component will be unduly large and, hence, the resulting resin will have a poor surface gloss. Alternatively, it may happen that the rubber component does not undergo phase inversion and falls into a gel state.

No particular limitation is placed on the type of the first reactor in which the rubber component phase present in the raw material solution is subjected to phase inversion, and any reactor in common use for bulk or solution polymerization may be used. However, it is preferable to use a reactor including a screw type agitator mounted in a draft tube and provided with an auxiliary agitator at the bottom and having an inlet port for the raw material solution in its bottom. In this case, the relationship between the agitation speed N (in rps) of the screw type agitator and the diameter D (in meters) of the screw type agitator is preferably represented by $$N^2 \cdot D > 1.0.$$

It is generally known that, in the phase inversion stage for transforming the rubber component into dispersed particles within a reactor, the size of the resulting dispersed particles depends on the agitation intensity of the reactor.

If $N^2 \cdot D \leq 1.0$, the agitation intensity is so low that the resulting dispersed particles of the rubber component will be unduly large and, hence, the surface gloss of the resulting resin will be impaired.

The above-described first reactor for subjecting the rubber component present in the raw material solution to phase inversion may also comprise a reactor including a helical-ribbon-blade provided with an auxiliary agitator at the bottom and having an inlet port for the raw material solution in its bottom. In this case, the relationship between the agitation speed N (in rps) of the helical-ribbon-blade and the diameter D (in meters) of the helical-ribbon-blade is preferably represented by $$N^2 \cdot D > 1.0.$$

If $N^2 \cdot D \leq 1.0$, the agitation intensity is so low that the resulting dispersed particles of the rubber component will be unduly large and, hence, the surface gloss of the resulting resin will be poor.

Thus, the raw material solution comprising a mixture of the aromatic vinyl monomer and the vinyl cyanide monomer and the rubber component dissolved therein, together with the radical polymerization initiator, is continuously fed to the first reactor and polymerized under high-shear agitation so as to transform the rubber component into finely dispersed particles. The reaction mixture is then, continuously withdrawn from the first reactor at the rate corresponding to the feed rate of the raw material solution, and fed to a second or more reactors for further polymerization. No particular limitation is placed on the type of the second or more reactors in which the reaction mixture withdrawn continuously from the first reactor is subjected to further polymerization, and any reactor in common use for bulk or solution polymerization may be used. Preferably, one to five reactors, one to five tubular or tower reactors of the piston flow type, or a combination thereof is used for this purpose. It is a common practice to continue the polymerization of the monomers in these second or more reactors until the desired conversion is attached and then withdraw the reaction mixture continuously from the final reactor. The reaction mixture withdrawn from the final reactor is introduced into a conventionally known devolatilization device for removing unreacted monomers and the solvent. Thereafter, the polymer is recovered as a resin product.

In the process of the present invention, a chain transfer agent such as a mercaptan may be used, if desired, in order to regulate the molecular weight of the resulting polymer. Where such a chain transfer agent is used, it may be totally added to the raw material solution. However, it is preferable to add a part of the chain transfer agent to the reaction mixture withdrawn from the first reactor. Moreover, if desired, an antioxidant such as an alkylated phenol and a plasticizer or lubricant such as butyl stearate, zinc stearate, mineral oil or the like may also be added either to the raw material solution or to the reaction mixture during the course of the polymerization or upon completion of the polymerization.

According to the process of the present invention, an aromatic vinyl monomer and a vinyl cyanide monomer can be subjected to continuous bulk or solution polymerization in the presence of a rubber component by using equipment in common use for the continuous bulk or solution polymerization of HI-PS resins and following substantially the same procedure as for the continuous bulk or solution polymerization of HI-PS resins. Thus, ABS resins exhibiting excellent chemical resistance, thermal resistance and rigidity and having a good surface gloss can be produced.

The present invention is further illustrated by the following examples in which parts are by weight:

EXAMPLE 1

A raw material solution was prepared by using 6.0 parts of a polybutadiene, commercially available under the trade name of "Asaprene 700A" from Asahi Kasei Co., as the rubber component and dissolving it in a mixture (in a styrene/acrylonitrile weight ratio of 75/25) of 55.5 parts of styrene, 18.5 parts of acrylonitrile, and 20.0 parts of ethylbenzene. Asaprene 700A has a viscosity of 45 centistokes when measured as a 5% solution in styrene at 30° C. After the addition of 0.1 part of tert-dodecyl mercaptan, 0.02 part of benzoyl peroxide (BPO: 10-hour half-life decomposition temperature, 74° C.) as a radical polymerization initiator, and 0.20 part of 2,6-di-tert-butylphenol as an antioxidant, the raw material solution was continuously fed at a rate of 15.0 liters per hour to a first reactor including a screw type agitator mounted in a draft tube and provided with an auxiliary agitator at the bottom and having an inlet port for the raw material solution in its bottom. The internal volume of the first reactor was 18.0 liters and the outer diameter of the screw type agitator was 0.18 meter. In the first reactor, polymerization was carried out at a temperature of 110° C. with the agitator operated at a agitation speed of 3 rps, so that the rubber component was subjected to phase inversion (i.e., transformed into finely dispersed particles). The reaction mixture, having undergone polymerization in the first reactor, was continuously withdrawn therefrom and fed to a second reactor for further polymerization. The conversion of the monomers at the first reactor was 25% by weight. As the second reactor, there was used a perfect-mixing type reactor including a screw type agitator mounted in a draft tube and not provided with any auxiliary agitator. The reaction mixture, having undergone polymerization in the second reactor, was continuously withdrawn therefrom and successively fed to third, fourth and fifth reactors. Thus, the polymerization was continued in such a way that the conversion of the monomers at the fifth reactor was 73% by weight. The third, fourth and fifth reactors were of the same type as the second one. The reaction mixture withdrawn continuously from the fifth reactor was introduced into a conventionally known devolatilization device to remove unreacted monomers and the solvent at an elevated temperature and a high vacuum, and then pelletized with an extruder to obtain an ABS resin product. Using a 4-ounce injection molding machine, test pieces were made of the product and their properties were evaluated. The evaluation results are shown in Table 1. (The evaluation results obtained in the succeeding examples are also summarized in Table 1.)

As can be seen from these evaluation results, the product exhibited excellent fluidity, impact resistance, rigidity and thermal resistance and had a good surface gloss.

In the succeeding examples, the after-treatment and molding conditions were all the same as in this example.

EXAMPLE 2

The procedure of Example 1 was repeated except that the polybutadiene used as the rubber component in the raw material solution was replaced by a styrene-butadiene copolymer, commercially available under the trade name of "TUFDENE 2000A" from Asahi Kasei Co. and having a viscosity of 50 centistokes when measured as a 5% solution in styrene at 30° C.

EXAMPLE 3

The procedure of Example 1 was repeated except that the styrene/acrylonitrile weight ratio of the raw material solution was changed to 59/41 (i.e., 43.66 parts of styrene and 30.34 parts of acrylonitrile) and the polymerization temperature of the first reactor was reduced to 108° C. Moreover, styrene was continuously added to the reaction mixture at the respective inlet ports of the second to fifth reactors so that the weight ratio of unreacted styrene to unreacted acrylonitrile might be adjusted to 59/41.

EXAMPLE 4

The procedure of Example 1 was repeated except that a raw material solution consisting of 8.0 parts of the rubber component, 54.0 parts of styrene, 18.0 parts of acrylonitrile and 20.0 parts of ethylbenzene was used, the polymerization temperature of the first reactor was reduced to 109° C., and the agitation speed of the agitator was raised to 4 rps. The conversion of the monomers at the first reactor was 23% by weight.

EXAMPLE 5

The procedure of Example 1 was repeated except that 0.04 part of lauroyl peroxide (LPO: 10-hour half-life decomposition temperature, 62° C.) was used as the radical polymerization initiator and the polymerization temperature of the first reactor was reduced to 105° C. The conversion of the monomers at the first reactor was 24% by weight.

EXAMPLE 6

The procedure of Example 1 was repeated except that the first reactor was replaced by a reactor including a helical-ribbon-blade provided with an auxiliary agitator at the bottom and having an inlet port for the raw material solution in its bottom, the raw material solution was fed at a rate of 16.2 liters per hour, and the agitation speed of the agitator was reduced to 2.5 rps. The internal volume of the first reactor was 18.8 liters and the outer diameter of the helical-ribbon-blade was 0.25 meter.

EXAMPLE 7

The procedure of Example 1 was repeated except that the second to fifth reactors were replaced by four commonly-used tower reactors of the piston flow type.

EXAMPLE 8

The procedure of Example 1 was repeated except that a raw material solution was prepared by dissolving 5.0 parts of the polybutadiene, "Asaprene 700A", in a mixture of 45.0 parts of styrene, 15.0 parts of acrylonitrile and 35.0 parts of ethylbenzene and then 0.03 part of BPO and 0.2 part of 2,6-di-tert-butylphenol were added. The conversion of the monomers at the first reactor was 25% by weight.

EXAMPLE 9

The procedure of Example 1 was repeated except that a raw material solution was prepared by dissolving 6.0 parts of the polybutadiene, "Asaprene 700A", in a mixture of 66.7 parts of styrene, 22.3 parts of acrylonitrile and 5.0 parts of ethylbenzene, then 0.01 part of BPO, 0.2 part of tert-dodecyl mercaptan and 0.2 part of 2,6-di-tert-butylphenol were added to the raw material solution, and an ethylbenzene/styrene/acrylonitrile mixture in a weight ratio of 50.0/37.5/12.5 was continuously fed to the inlet port of the second reactor at a rate of 4 liters per hour. The conversion of the monomers at the first reactor was 16% by weight.

COMPARATIVE EXAMPLE 1

The apparatus used in this comparative example was the same as used in Example 1. A raw material solution was prepared dissolving 6.0 parts of the polybutadiene, "Asaprene 700A", in a mixture of 74.0 parts of styrene and 20.0 parts of ethylbenzene. After the addition of 0.03 part of BPO as a polymerization initiator and 0.20 part of 2,6-di-tert-butylphenol as an antioxidant, the raw material solution was continuously fed to the first reactor at a rate of 12.0 liters per hour and polymerized at 115° C. The conversion of the monomer at the first reactor was 22% by weight. The polymerization within the second and succeeding reactors was carried out in such a way that the conversion of the monomer at the fifth reactor was 73% by weight. In other respects, the procedure of Example 1 was repeated. The resulting product was inferior in impact resistance, rigidity and thermal resistance to the ABS resin obtained in Example 1. The evaluation results are shown in Table 2. (The evaluation results obtained in the succeeding comparative examples are also summarized in Table 2. The after-treatment and molding conditions were all the same as in Example 1.)

COMPARATIVE EXAMPLE 2

The procedure of Example 3 was repeated except that the styrene/acrylonitrile weight ratio of the raw material solution was changed to 40/60 (i.e., 29.6 parts of styrene and 44.4 parts of acrylonitrile) and 0.20 part of tert-dodecyl mercaptan was added to the raw material solution. The resulting product exhibited an increase in thermal resistance and rigidity, but a decrease in fluidity, impact strength and gloss.

COMPARATIVE EXAMPLE 3

The procedure of Example 1 was repeated except that another polybutadiene, commercially available under the trade name of "Diene NF55A" from Asahi Kasei Co. and having a viscosity of 160 centistokes when measured as a 5% solution in styrene at 30° C., was used as the rubber component in the raw material solution. The dispersed particles of the rubber component were so large that the resulting product had a poor gloss.

COMPARATIVE EXAMPLE 4

The procedure of Example 1 was repeated except that a raw material solution consisting of 12.0 parts of the rubber component, 51.0 parts of styrene, 17.0 parts of acrylonitrile and 20.0 parts of ethylbenzene was used. As a result, the reaction mixture increased in viscosity and formed a gel prior to phase inversion within the first reactor, so that no normal product could be obtained.

COMPARATIVE EXAMPLE 5

The procedure of Example 1 was repeated except that the polymerization initiator was replaced by 0.04 part of di-tert-butyl peroxide (DTBPO: 10-hour half-life decomposition temperature, 124° C.). The resulting product had a poor gloss.

COMPARATIVE EXAMPLE 6

The procedure of Example 1 was repeated except that no polymerization initiator was used and the polymerization was thermally initiated by raising the temperature of the first reactor to 130° C. The resulting product had a poor gloss.

COMPARATIVE EXAMPLE 7

The procedure of Example 1 was repeated except that the polymerization temperature of the first reactor was reduced to 90° C. The conversion of the monomers at the first reactor was 9% by weight and the reaction mixture residing in the first reactor did not undergo any phase invention.

COMPARATIVE EXAMPLE 8

The procedure of Example 1 was repeated except that the polymerization temperature was raised to 117° C. The conversion of the monomers at the first reactor was 40% by weight. The resulting product had a poor gloss.

COMPARATIVE EXAMPLE 9

A raw material solution was prepared by dissolving 5.0 parts of the polybutadiene, "Asaprene 700A", in a mixture of 37.5 parts of styrene, 12.5 parts of acrylonitrile and 45.0 parts of ethylbenzene. After the addition of 0.05 part of BPO and 0.2 part of 2,6-di-tert-butylphenol, the raw material solution was continuously fed to the first reactor. Thereafter, the procedure of Example 1 was repeated. Although the conversion of the monomers at the first reactor was 30% by weight, the dispersed particles of the rubber component were so large that the resulting product had a poor gloss. Moreover, its yield was decreased.

REFERENCE EXAMPLE

The procedure of Example 1 was repeated except that the agitation speed of the screw type agitator included in the first reactor was reduced to 2 rps. The resulting product had a poor gloss.

TABLE 1

| Example No. | 1 | 2 | 3 | 4 | 5 | 6 | 7 | 8 | 9 |
|---|---|---|---|---|---|---|---|---|---|
| Raw material solution | | | | | | | | | |
| Rubber component (parts) | 6.0 | 6.0 | 6.0 | 8.0 | 6.0 | 6.0 | 6.0 | 5.0 | 6.0 |
| Type of rubber component | Asaprene 700A | TUFDENE 2000A | Asaprene 700A | Asaprene 700A | Asaprene 700A | Asaprene 700A | Asaprene 700A | Asaprene 700A | Asaprene 700A |
| Styrene/acrylonitrile weight ratio | 75/25 | 75/25 | 59/41 | 75/25 | 75/25 | 75/25 | 75/25 | 75/25 | 75/25 |
| Ethylbenzene (parts) | 20.0 | 20.0 | 20.0 | 20.0 | 20.0 | 20.0 | 20.0 | 35.0 | 5.0 |
| Initiator (parts) | 0.02 | 0.02 | 0.02 | 0.02 | 0.04 | 0.02 | 0.02 | 0.03 | 0.01 |
| Type of initiator | BPO | BPO | BPO | BPO | LPO | BPO | BPO | BPO | BPO |
| Conversion of monomers at first reactor (% by weight) | 25 | 25 | 25 | 23 | 24 | 25 | 25 | 25 | 16 |
| Agitation speed of agitator of first reactor (rps) | 3 | 3 | 3 | 4 | 3 | 2.5 | 3 | 3 | 3 |
| $N^2 \cdot D$ | 1.62 | 1.62 | 1.62 | 2.88 | 1.62 | 1.56 | 1.62 | 1.62 | 1.62 |
| Properties | | | | | | | | | |
| Melt flow index[1] (g/10 min) | 2.0 | 2.0 | 1.6 | 1.8 | 2.0 | 2.0 | 1.9 | 1.9 | 2.1 |
| Yield strength in tension[2] (kg/cm$^2$) | 540 | 560 | 590 | 450 | 540 | 540 | 540 | 530 | 580 |
| Izod impact strength[3] (kg-cm/cm) | 11.1 | 11.5 | 10.6 | 14.8 | 11.2 | 11.2 | 11.5 | 12.1 | 9.8 |
| Gloss[4] (%) | 70 | 71 | 71 | 66 | 70 | 70 | 70 | 65 | 71 |
| Vicat softening point[5] (°C.) | 108.2 | 108.4 | 110.1 | 107.6 | 108.0 | 108.3 | 108.0 | 108.6 | 108.0 |
| Styrene/acrylonitrile weight ratio in polymer | 75/25 | 75/25 | 70/30 | 75/25 | 75/25 | 75/25 | 75/25 | 75/25 | 75/25 |

(Notes)
Molding conditions: 4-ounce injection molding machine; molding temperature, 230° C.; mold temperature, 50° C.
[1] ASTM D-1238 (200° C.; 5,000 g).
[2] ASTM D-638.
[3] ASTM D-256 (¼ inch × ½ inch notched specimen).
[4] JIS-Z-8741 (angle of incidence, 60°).
[5] ASTM D-1525 (load, 1 kg).

TABLE 2

| Comparative Example No. | 1 | 2 | 3 | 4 | 5 | 6 | 7 | 8 | 9 | Reference Example |
|---|---|---|---|---|---|---|---|---|---|---|
| Raw material solution | | | | | | | | | | |
| Rubber component (parts) | 6.0 | 6.0 | 6.0 | 12.0 | 6.0 | 6.0 | 6.0 | 6.0 | 5.0 | 6.0 |
| Type of rubber component | Asaprene 700A | Asaprene 700A | Diene NF55A | Asaprene 700A | Asaprene 700A | Asaprene 700A | Asaprene 700A | Asaprene 700A | Asaprene 700A | Asaprene 700A |
| Styrene/acrylonitrile weight ratio | 100/0 | 40/60 | 75/25 | 75/25 | 75/25 | 75/25 | 75/25 | 75/25 | 75/25 | 75/25 |
| Ethylbenzene (parts) | 20.0 | 20.0 | 20.0 | 20.0 | 20.0 | 20.0 | 20.0 | 20.0 | 45.0 | 20.0 |
| Initiator (parts) | 0.03 | 0.02 | 0.02 | 0.02 | 0.04 | 0 | 0.02 | 0.02 | 0.05 | 0.02 |
| Type of initiator | BPO | BPO | BPO | BPO | DTBPO | — | BPO | BPO | BPO | BPO |
| Conversion of monomers at first reactor (% by weight) | 22 | 24 | 25 | — | 23 | 23 | 9 | 40 | 30 | 25 |
| Agitation speed of agitator of first reactor (rps) | 3 | 3 | 3 | 3 | 3 | 3 | 3 | 3 | 3 | 2 |

TABLE 2-continued

| Comparative Example No. | 1 | 2 | 3 | 4 | 5 | 6 | 7 | 8 | 9 | Reference Example |
|---|---|---|---|---|---|---|---|---|---|---|
| $N^2 \cdot D$ | 1.62 | 1.62 | 1.62 | 1.62 | 1.62 | 1.62 | 1.62 | 1.62 | 1.62 | 0.72 |
| Properties | | | | | | | | | | |
| Melt flow index (g/10 min) | 2.8 | 0.8 | 2.0 | — | 2.1 | 2.0 | — | 2.0 | 1.7 | 2.0 |
| Yield strength in tension (kg/cm$^2$) | 300 | 650 | 500 | — | 510 | 500 | — | 520 | 510 | 530 |
| Izod impact strength (kg-cm/cm) | 7.3 | 7.5 | 8.3 | — | 8.5 | 8.3 | — | 8.6 | 13.1 | 10.0 |
| Gloss (%) | 65 | 62 | 18 | — | 30 | 24 | — | 33 | 38 | 48 |
| Vicat softening point (°C.) | 102.4 | 112.1 | 108.1 | — | 107.9 | 108.1 | — | 108.3 | 107.7 | 108.3 |
| Styrene/acrylonitrile weight ratio in polymer | 100/0 | 65/35 | 75/25 | — | 75/25 | 75/25 | — | 75/25 | 75/25 | 75/25 |

What is claimed is:

1. A continuous bulk or solution polymerization process for producing rubber modified high-impact resins which comprises continuously feeding a raw material solution including a mixture of an aromatic vinyl monomer and vinyl cyanide monomer and a rubber component dissolved in said mixture, together with a radical polymerization initiator, to a first reactor, polymerizing said raw material solution under high-shear agitation to the conversion required to transform the rubber component phase into dispersed particles, withdrawing the reaction mixture continuously from said first reactor at a rate corresponding to the feed rate of said raw material solution, and feeding said reaction mixture to a second or more reactors for further polymerization, the process being characterized in that
  (a) the weight ratio of said aromatic vinyl monomer to said vinyl cyanide monomer present in said raw material solution ranges from 99/1 to 50/50;
  (b) said rubber component is a polybutadiene and has a viscosity of not greater than 100 centistokes when measured as a 5% solution in styrene at 30° C.;
  (c) the content of said rubber component in said raw material solution is not greater than 10% by weight;
  (d) the content of a solvent in said raw material solution is not greater than 40% by weight;
  (e) said radical polymerization initiator has a 10-hour half-life decomposition temperature of 100° C. or below;
  (f) said radical polymerization initiator is fed to said first reactor in an amount of not less than 30 ppm based on said raw material solution; and
  (g) the conversion of said monomers at said first reactor is controlled in such a way that it lies between 10 and 30% by weight,
said first reactor includes a screw agitator mounted in a draft tube and provided with an auxiliary agitator at the bottom or a helical-ribbon blade provided with an auxiliary agitator at the bottom and has an inlet port for said raw material solution in the bottom of said first reactor, and wherein the relationship between the agitation speed N, in rps, of said screw agitator or said helical-ribbon blade and the diameter D, in meters, of said screw agitator or said helical-ribbon blade is represented by $N \cdot D > 1.0$.

2. A continuous bulk or solution polymerization process for producing rubber modified high-impact resins which comprises continuously feeding a raw material solution including a mixture of an aromatic vinyl monomer and vinyl cyanide monomer and a rubber component dissolved in said mixture, together with a radical polymerization initiator, to a first reactor, polymerizing said raw material solution under high-shear agitation to the conversion required to transform the rubber component phase into dispersed particles, withdrawing the reaction mixture continuously from said first reactor at a rate corresponding to the feed rate of said raw material solution, and feeding said reaction mixture to a second or more reactors for further polymerization, the process being characterized in that
  (a) the weight ratio of said aromatic vinyl monomer to said vinyl cyanide monomer present in said raw material solution ranges from 99/1 to 50/50;
  (b) said rubber component is a member selected from the group consisting of a polybutadiene and a styrene-butadiene copolymer, and has a viscosity of not greater than 100 centistokes when measured as a 5% solution in styrene at 30° C.;
  (c) the content of said rubber component in said raw material solution is not greater than 10% by weight;
  (d) the content of a solvent in said raw material solution is not greater than 40% by weight;
  (e) said radical polymerization initiator has a 10-hour half-life decomposition temperature of 100° C. or below;
  (f) said radical polymerization initiator is fed to said first reactor in an amount of not less than 30 ppm based on said raw material solution; and
  (g) the conversion of said monomers at said first reactor is controlled in such a way that it lies between 10 and 30% by weight,
said first reactor includes a screw agitator mounted in a draft tube and provided with an auxiliary agitator at the bottom or a helical-ribbon blade provided with an auxiliary agitator at the bottom and has an inlet port for said raw material solution in the bottom of said frist reactor, and wherein the relationship between the agitation speed N, in rps, of said screw agitator or said helical-ribbon blade and the diameter D, in meters, of said screw agitator or said helical-ribbon blade is represented by $N \cdot D > 1.0$.

* * * * *